United States Patent [19]

Distin, Jr. et al.

[11] Patent Number: 4,554,846
[45] Date of Patent: Nov. 26, 1985

[54] TWO-PIECE RETAINER FOR EPICYCLIC TRANSMISSIONS

[75] Inventors: Robert G. Distin, Jr.; Thomas J. Lang, both of Louisville; David E. Smith, Lafayette, all of Colo.

[73] Assignee: Advanced Energy Concept "81 Ltd., Boulder, Colo.

[21] Appl. No.: 578,933

[22] Filed: Feb. 10, 1984

[51] Int. Cl.⁴ ............................................. F16H 1/28
[52] U.S. Cl. ....................................... 74/805; 74/804
[58] Field of Search ................. 74/804, 805, 801, 797, 74/63, 202, 465

[56] References Cited

U.S. PATENT DOCUMENTS

| 1,767,866 | 6/1930 | Wildhaber | 74/804 |
| 1,831,577 | 11/1931 | Richer | 74/804 |
| 1,867,492 | 7/1932 | Braren | 74/804 |
| 4,023,440 | 5/1977 | Kennington et al. | 74/804 |

FOREIGN PATENT DOCUMENTS

| 1750279 | 3/1971 | Fed. Rep. of Germany | 74/804 |
| 991088 | 1/1983 | U.S.S.R. | 74/804 |

Primary Examiner—Leslie A. Braun
Assistant Examiner—Dwight G. Diehl
Attorney, Agent, or Firm—Sughrue, Mion, Zinn, Macpeak & Seas

[57] ABSTRACT

An epicyclic transmission having first and second confronting surface regions and cylindrical rollers for transmitting torque therebetween includes a two-piece retainer for axially and radially positioning the rollers relative to the confronting surface regions. A first retainer piece includes a top and bottom surface interconnected by a plurality of bars shaped and arranged into pairs for rotatably supporting the rollers so that one end face of the rollers contacts and is supported by the bottom surface. A second retainer piece confronts the top surface so as to support an opposite end face of the rollers.

16 Claims, 7 Drawing Figures

TWO-PIECE RETAINER FOR EPICYCLIC TRANSMISSIONS

CROSS-REFERENCES TO RELATED APPLICATIONS

The present application is related to U.S. Application Ser. Nos. 313,442 and 362,195, one of the present joint inventors being one of the co-inventors of each of these related applications. The disclosure of each of these related applications is hereby incorporated by reference.

BACKGROUND OF THE INVENTION

The present invention relates to a retainer for maintaining cylindrical rollers in proper spaced relationship between an epitrochoidal-like shaped and a hypotrochoidal-like shaped conjugate set of races in an epicyclic speed reducing transmission of the kind described in the above-mentioned Ser. No. 362,195 application.

Good positional control of rollers held between epitrochoidal-like shaped and hypotrochoidal-like shaped races in an epicyclic speed reducing transmission is essential to obtain optimum performance. Accordingly, it is essential that the axial and radial positioning of the rollers be accurately controlled by a retainer as the epicyclic speed reducing transmission is operated. In addition, the structure of the retainer should not limit the design of the races so that the races can be designed to achieve optimum performance of the transmission.

It is also desirable that the retainer used for maintaining proper positional control of the cylindrical rollers be constructed to allow confronting lobes on the epitrochoidal-like shaped and the hypotrochoidal-like shaped races to nearly touch at the point of closest approach. Such a lobe design of the races allows the cylindrical rollers to transfer maximum possible torque between the races. Accordingly, the retainer construction preferably should allow the use of relatively small, solid, rather than relatively large, hollow, cylindrical rollers so that the size of the cylindrical rollers can be minimized. Solid rollers are also more economical to produce than are hollow rollers. In addition, the retainer preferably should not contact any substantial part of the driving and driven surfaces of the races.

SUMMARY OF THE INVENTION

Accordingly, an object of the present invention is to provide a retainer for maintaining cylindrical rollers in proper spaced relationship in an epicyclic speed reducing transmission which contains a set of conjugate epitrochoidal-like shaped and hypotrochoidal-like shaped races so that each of the cylindrical rollers is equally spaced from one another.

A further object of the present invention is to provide a retainer which allows the use of conventional solid rollers in such a transmission.

A yet further object is to provide a retainer which achieves accurate positional control of the rollers and provides excellent axial positioning of the rollers.

Another object is to provide a retainer which comprises a simple and economical, two-piece design which can be molded or cast from either plastic or metal material by utilizing relatively simple forming techniques.

A still further object of the present invention is to provide a retainer which allows confronting lobes of the conjugate set of races to nearly touch at the point of nearest approach so that maximum possible torque is transferred between the races by the cylindrical rollers.

These and other objects are achieved by a retainer which includes a first retainer piece having a top and a bottom surface interconnected by a plurality of bars, the bars being shaped and arranged into a plurality of pairs each comprising first and second bars. The first and second bars have confronting first curved surfaces between which one of the cylindrical rollers is rotatably retained, each of the bars having further second and third surfaces which continuously taper towards one another and meet at an apex so that each bar has a wedge-like shape.

Preferably, the second and third surfaces of each bar taper towards each other at a rate which is sufficiently large to ensure that neither of these surfaces contact either of the races of the transmission. However, in some embodiments, it is permissible to have portions of the second or third surfaces contact one or both of the races in a vicinity of the races which is offset from a top dead center position of a cam driving one of the races by an angle between 20° and 70°, provided that the retainer is made of a relatively soft material such as plastic.

One end face of each of the rollers confronts and contacts the bottom surface of the first retainer piece while an opposite end face of each of the rollers contacts a surface of a second retainer piece which is attached to the top surface of the first retainer piece. The bottom surface of the first retainer piece, as well as the surface of the second retainer piece which confronts one of the end faces of the cylindrical rollers, each has a plurality of lobes formed thereon which contact the end faces of the cylindrical rollers at positions lying on a cylindrical axis of each of the rollers so as to reduce friction.

DESCRIPTION OF THE PREFERRED EMBODIMENTS

1. Description of Epicyclic Speed Reducing Transmission

Figure 1:
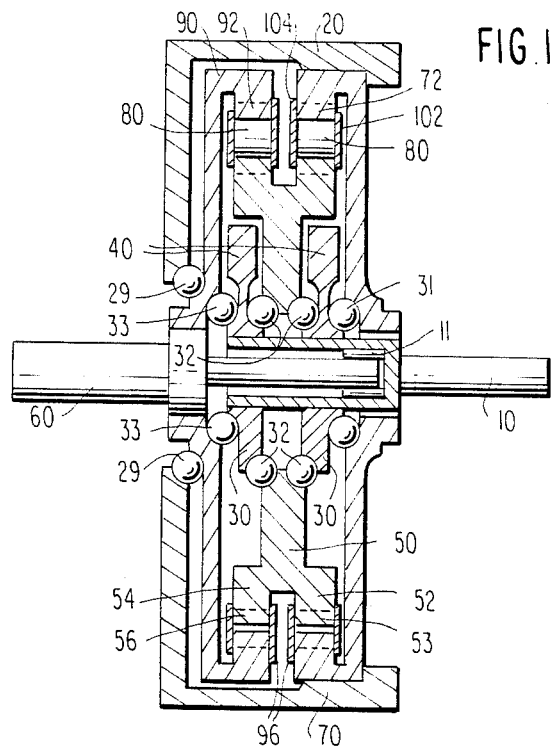
FIG. 1 is a sectional view of a two-stage, epicyclic speed reducing transmission utilizing a retainer constructed according to the present invention.
Figure 2:
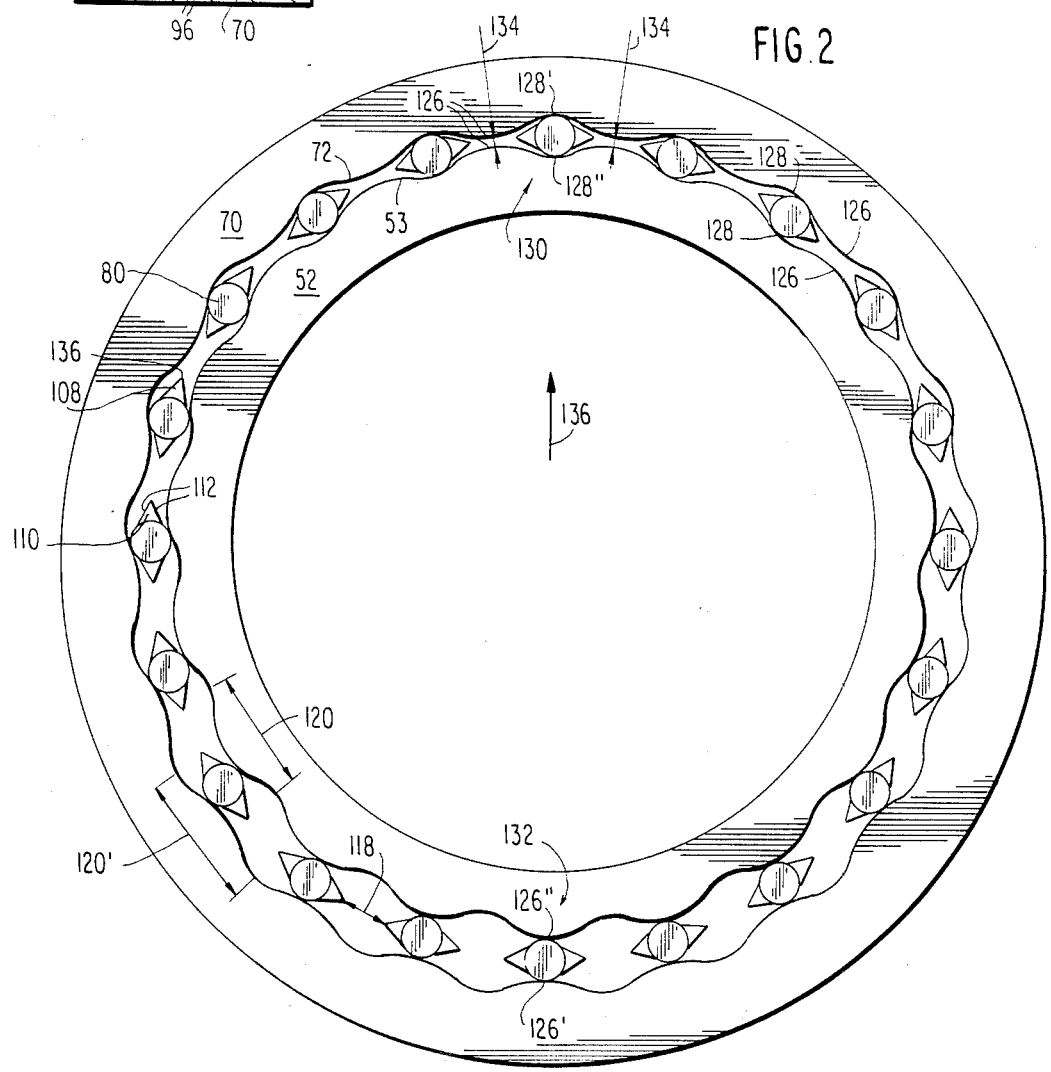
FIG. 2 is a schematic view of opposed, hypotrochoidal-like shaped and epitrochoidal-like shaped surfaces 72, 53 utilized in the transmission of FIG. 1, with rollers 80 shown engaged between these surfaces and maintained in spaced relationship by bars 108 of a retainer of the present invention.

FIG. 1 is a sectional view of an epicyclic speed reducing transmission disclosed in copending Application Ser. No. 362,195. The epicyclic speed reducing transmission shown in FIG. 1 utilizes first and second conjugate sets of races 72, 53 and 92, 56 for achieving first and second speed reductions, respectively, and each set of conjugate races has a plurality of cylindrical rollers 80 disposed therein for transmitting torque between respective first and second confronting surface regions 72, 53 and 92, 56 of each set of conjugate races. The shape of the first and second confronting surface regions 72, 53 of the first set of conjugate races utilized by the transmission of FIG. 1 is shown in FIG. 2, and a further description thereof is found in the copending Application Ser. No. 362,195, cited above. Methods of making these races are described in copending Application Ser. Nos. 313,442 and 362,195.

In FIG. 1, first gear means 70 is fixed to a stationary housing 20, and the first gear means 70 functions as a stator in operation. The first surface region 72 of the first gear means 70 is formed with a trochoidal-like curvature, and the first surface region confronts a second surface region 53 which is also formed with a trochoidal-like shaped curvature. The second surface region 53 is formed on a first gear element 52 of second gear means 50. The first and second confronting surface regions 72, 53 together comprise the first conjugate set of races.

The second gear means 50 is journalled on concentric cams 30 formed on an input shaft 10 by means of a ring of bearings 32. The input shaft 10 is received in the housing 20 and is journalled for rotation therein by means of rollers bearings 11 which separate the input shaft 10 from an extension of an output shaft 60. The eccentric cams 30 and the input shaft 10 are further supported against the housing 20 by further bearing elements 31 and against an output gear element 90 by bearing elements 33.

As the input shaft 10 is rotated, the second gear means 50 is made to undergo orbital motion by the eccentric cams 30, and a pair of counterweights 40 are provided on the input shaft 10 opposite the most highly eccentric portion of the cams 30 for balancing the transmission as the input shaft 10 is rotated. The orbiting speed of the second gear means 50 is proportional to the rotational speed of the input shaft 10. In addition, due to the presence of the bearings 32, the second gear means 50 is capable of rotating about its axis independently of the orbital motion imparted thereto by the input shaft 10 and the eccentric cams 30. As is evident from the race positions shown in FIG. 2, a top dead center radial position of the cams 30 in FIG. 2 is aligned with arrow 136. As the cams 30 rotate one full rotation, the top dead center position of the cams also rotates one full rotation, as does the point of closest approach 134 between the races 53, 72.

The cylindrical rollers 80 are maintained in spaced relationship between the first and second confronting surface regions 72, 53 of the first set of conjugate races by a retainer 96, and the cylindrical rollers 80 transmit torque between the stator race 72 and its conjugate race 53. The second gear means 50 is a generally disc-shaped element which is bifurcated at its radial outer periphery to form the first gear element 52 and a second gear element 54, and, as indicated, the race 53 is formed on the first gear element 52. The second gear element 54 also has an outer surface 56 formed with trochoidal-like shaped curvature which confronts a further trochoidal-like shaped surface 92 formed on the output gear element 90. The surfaces 56, 92 form the second set of conjugate races, and further cylindrical rollers 80 are maintained in spaced relationship by an additional retainer 96 between the surfaces 56, 92 so that the additional rollers 80 transmit torque between the surfaces 56, 92. The output gear element 90 is connected to the output shaft 60, and the bearing elements 29 support the output gear 90 against the housing 20.

As the input shaft 10 is rotated, the eccentric cams 30 cause the second gear means 50 to orbit, and the second gear means 50 is caused to rotate at a first speed reduction due to the roller engagement between the first and second confronting surface regions 72, 53. The output gear element 90 and its associated output shaft 60 are also caused to rotate at a second speed reduction due to the roller engagement between the second set of conjugate races 92, 56.

FIG. 2 schematically shows the first surface region 72 of the first gear means or stator 70 engaged with the second surface region 53 of the first gear element 52 of the second gear means 50 via the plurality of cylindrical rollers 80. As indicated, the first and second surface regions 72, 53 are conjugate, trochoidal-like shaped, with one of the surface regions being epitrochoidal-like shaped while the other surface region is hypotrochoidal-like shaped. In the embodiment shown in FIG. 2, the first surface region 72 of the stator 70 is hypotrochoidal-like shaped, while the second surface region 53 of the first gear element 52 is epitrochoidal-like shaped, though an opposite configuration is also possible.

It should be noted that the first and second surface regions 72, 53 are not shaped so as to form true trochoidal curves and, specifically, true epitrochoidal and hypotrochoidal curves, since these surfaces are formed so that the center axis of each of the cylindrical rollers 80 travels a true trochoidal curved path as the rollers 80 transmit torque between the first and second surface regions 72, 53. Since the cylindrical rollers 80 have a finite diameter, the first and second surface regions 72, 53 are necessarily spaced from the center axis of each of the cylindrical rollers and, accordingly, have a shape which necessarily deviates slightly from the true trochoidal path. However, the shapes of the surface regions 72, 53 approach that of a true trochoidal curve and, specifically, a true hypotrochoidal and epitrochoidal curve, respectively, as the radius of the cylindrical rollers 80 approaches zero.

Referring to FIG. 2, the hypotrochoidal-like surface region 72 has two more lobes 126 and two more recesses 128, respectively, than does the epitrochoidal-like shaped surface region 53, and the number of rollers 80 disposed therebetween corresponds to the number of lobes of the hypotrochoidal-like surface region, less one. However, if heavy loads are not anticipated, a lesser number of rollers than that shown in FIG. 2 can be used, e.g. one-half the number of rollers 80 shown in FIG. 2.

In the embodiment of FIG. 2, the positioning of the respective lobes 126 and recesses 128 of each of the surface regions 72, 53 and the cylindrical rollers 80 range from a first position 130 where one of the rollers 80 is entrained within opposing first 128' and second 128" recesses 128 to a second position 132 where another one of the rollers 80 is entrained between first 126' and second 126" confronting lobes 126, with the first and second positions 130, 132 being at diametrically opposite sides of the first gear means 80 and the first gear element 52. If only half the number of rollers 80 are utilized than the number shown in FIG. 2, one roller will be located at either the position 130 or 132 while no corresponding roller will be located at the other of these positions though the surface regions are spaced apart so that one such roller could be located at this other position.

As the inner gear member 52 orbits due to the rotational input from the input shaft 10 and the eccentric cams 30, assuming that the outer first gear means 70 is stationary, the inner gear element 52 will be caused to rotate about its axis at a speed determined by the relative number of lobes on the first and second surface regions 72, 53 as the rollers circulate or rollingly engage both these surface regions. Specific formulae for determining the output speed ratio are set forth in the above-mentioned, copending Application Ser. No. 362,195.

The second set of conjugate races 92, 56 are shaped like the first set of conjugate races 72, 53 except that the number of lobes and recesses on the second set of races differs from the number of lobes and recesses on the first set of races so that a second, different speed reduction is attained by the roller engagement of the second gear element 54 and the output gear element 90.

2. Description of Retainer for Epicyclic Speed Reducing Transmission

As indicated above, good position control of the rollers 80 is essential in the epicyclic speed reducing transmission to achieve desired optimum performance, and it is essential that the radial and the axial positions of the rollers be accurately controlled in operation.

Figure 3:
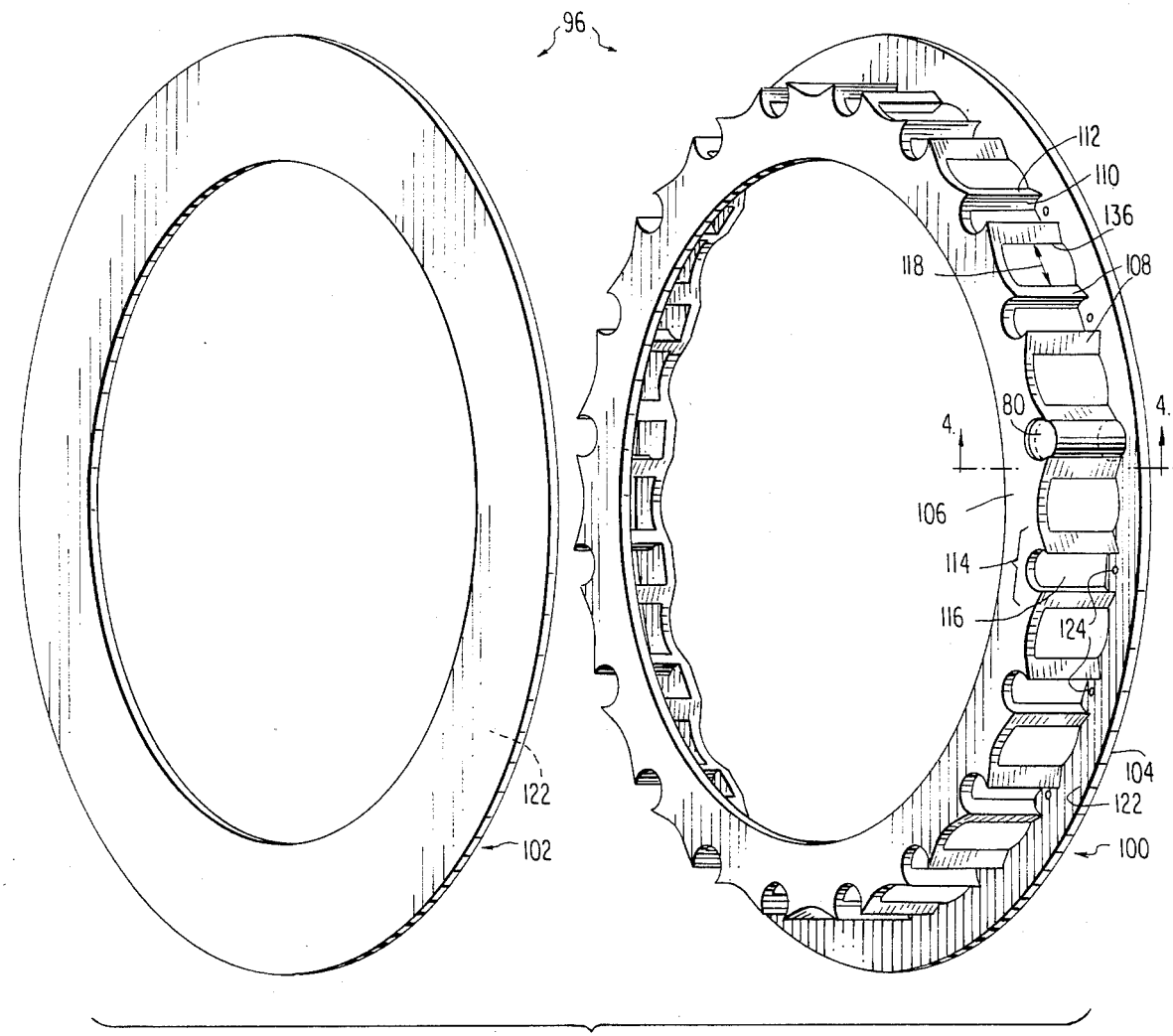
FIG. 3 is a perspective view illustrating one preferred embodiment of a retainer of the present invention.

FIG. 3 illustrates a perspective view of one embodiment of the retainer 96 for housing the cylindrical rollers 80 and for controlling the radial and axial positions thereof. The retainer 96 of FIG. 3 comprises a first retainer piece 100 which is connectable to a second retainer piece 102, as shown in FIG. 1. The first and second retainer pieces 100, 102 are formed from a piece of suitable material, such as plastic or metal, by using a cutter in a manner described below, or, alternatively, by using a mold. The second retainer piece 102 comprises a flat ring.

Figure 4:
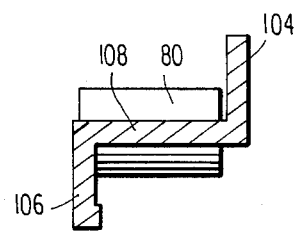
FIG. 4 is a side cross-sectional view taken along the line 4—4 in FIG. 3 showing part of the retainer of FIG. 3 illustrating its Z-shaped or step-shaped cross-section.

The first retainer piece 100 includes a first bottom ring 104 and a second top ring 106, and the rings 104, 106 are interconnected by a plurality of appropriately spaced and shaped thin bars 108 which extend perpendicularly between the rings 104, 106. As shown in FIG. 4, the first retainer piece 100 has a Z-shaped or step-shaped profile in cross-section. The bars are arranged in pairs 114, with each pair including first and second bars. Each of the cylindrical rollers 80 is rotatably retained in a space 116 between the first and second bars of each pair 114 of bars 108. The length of the bars is chosen such that the top and bottom rings 106, 104 contact one or both of the races 53, 72 on side surfaces thereof adjacent opposite end surfaces of the cylindrical rollers. Each bar 108 has a wedge-like shape which resembles a triangle in cross section, as illustrated in FIG. 2, with one of the sides 110 of the triangle or one of the faces 110 of the wedge being curved rather than flat or planar, respectively. The curved face 110 of each of the wedge-shaped bars is arc-shaped so as to have a radius of curvature substantially equal to the radius of curvature of the rollers 80, while the other two faces 112 of each of the wedge-shaped bars 108 are substantially planar and converge at an apex 136, although the faces 112 could also be made arc-shaped if desired.

As shown in FIG. 2, the faces 112 are specifically shaped so as to eliminate, or at least minimize, contact between the bars 108 and either of the races 53, 72. It is preferable to form the bars 108 and, specifically, the faces 112, so that contact between the bars 108 and the races 53, 72 does not occur as the transmission is operated so that a point of closest approach 134 of the races, which is always radially at or adjacent to the top dead center radial position of the cams 30, is minimized. Minimizing the point of closest approach 134 achieves maximum torque transfer between the races 53, 72, all other variables being equal.

If the retainer 96 is made of a relativly soft material such as plastic, as compared with the material from which the races 53, 72 are formed, the faces 112 can be shaped so that some contact, preferably a minimum amount, occurs between the bars and the races. With respect to the top dead center radial position of the cams 30 which, in FIG. 2, is aligned with the arrow 136, the bars 108 which contact either of the races 53, 72 should be confined to those bars offset from the top dead center radial position of the cams by an angle between 20° and 70° and between −20° and −70°. Preferably, the range should be between 30° and 60° and between −30° and −60° so that the amount of contact can be kept relatively small. Since, in operation, very little load is imposed on the retainer 96, frictional wear due to any contact between the bars and the races 53, 72 is minimal and does not pose a significant problem.

As indicated, each of the cylindrical rollers 80 is rotatably retained in the space 116 between the confronting curved faces 110 of the bars 108 of each pair 114 so as to be in close sliding contact with each of the arc-shaped faces 110. The distance 118 between adjacent pairs 114 of confronting bars is uniform and dependent on the distance 120 and 120' (FIG. 2) between the adjacent lobes and recesses of the conjugate races 53, 72, respectively.

The bottom ring 104 of the first retainer piece 100, as well as the second retainer piece 102, each has a plurality of small projections 124 or knobs on flat surfaces 122 thereof which confront and contact the opposite end faces of the cylindrical rollers 80. The projections 124 contact the end faces of the cylindrical rollers at points thereon which lie on the roller axes to reduce friction between end faces of the rollers and the flat surfaces 122 as the rollers roll and transmit torque. Since very little load is imposed on the retainer 96, frictional wear between the rollers 80 and the faces 110 and the lobes 124 does not pose a significant problem. In addition, frictional wear between the top and bottom surfaces 106, 104 and the side surfaces of the races 53, 72 is also not a problem.

Figure 1A:
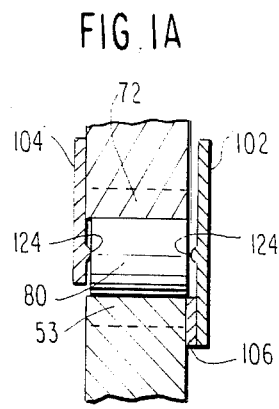
FIG. 1A is an enlarged view of a portion of the transmission shown in FIG. 1.

The first retainer piece 100 is placed between the conjugate races 53, 72 so that the top and bottom rings 106, 104 confront the opposite side surfaces of the conjugate races, as shown in the blown-up portion of FIG. 1A. Subsequently, the plurality of cylindrical rollers 80 are placed into the corresponding plurality of spaces 116 formed by the pairs 114 of confronting bars 108, and the second conjugate race is placed opposite the first conjugate race so that the rollers and the bars of the first retainer piece are held between the conjugate races, with the top and bottom rings 106, 104 of the first retainer piece being adjacent to the opposite side surfaces of the first gear means 70 and the first gear member 52. Then, the second retainer piece or ring 102 is placed adjacent and secured to the top ring 106 so that the knobs 124 on the second piece 102 confront and contact one of the end faces of the cylindrical rollers. Since the second retainer piece is adjacent to the top ring 106 which is in contact with the side surface of the race 53, the second retainer piece does not actually touch the side surface of the other race 72, as shown in the blown-up portion of FIG. 1. The bottom ring 104 and the second retainer piece 102 keep the cylindrical rollers from sliding out of the spaces 116 along an axial direction of the rollers 80, and movement of the rollers along their respective axial directions is minimized since the top and bottom rings 106, 104 are in sliding contact with the races 53, 72, respectively, at opposite axial sides of these races.

The first retainer piece 104 is formed from a solid piece of material by milling the material into a relatively flat, cylindrical shape so that the cylinder has an outer diameter which is equal to the outer diameter of the bottom ring 104. Subsequently, the interior portion of the cylinder is milled to form a flat ring having an inner diameter which corresponds to an inner diameter of the top ring 106. Then, a substantial axial length part of an outer surface of the flat ring is milled with a cutter from what will ultimately form the top ring side to form a wave-like shape, leaving a fraction of the outer surface untouched so as to form the outer circumferential part of the bottom ring 104. Accordingly, the axial outermost portion of the outer surface is not milled into a wave-like shaped surface. Thereafter, a substantial axial length part of the inner surface of the material being milled is further milled from an opposite side of the material (the bottom ring side) with the cutter into a second wave-like shape. Again, an axial, innermost portion of the inner surface is not milled into the second wave-like shape, and this axial, innermost portion corresponds to the top ring 106 shown in FIG. 3. Subsequently, the wave-shaped inner surface is further milled so that innermost lobes of the waves are carved away, and a plurality of holes are drilled into the outer wave-shaped surface at locations corresponding to places where the lobes of the innermost wave-shaped lobes are carved away. The operation of the milling cutter can be controlled by a computer so that an appropriately shaped first retainer piece is formed.

Figure 5:
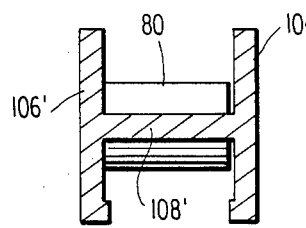
FIG. 5 is a side cross-sectional view of a part of a first retainer piece constructed according to a second embodiment of the present invention.
Figure 6:
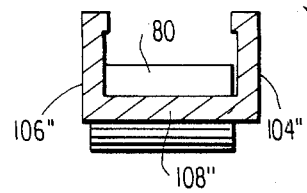
FIG. 6 is a side cross-sectional view of a part of a first retainer piece constructed according to a third embodiment of the present invention.
Figure 6:
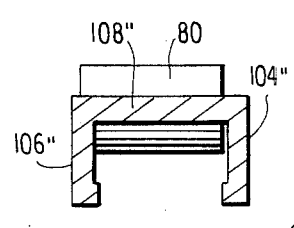

The embodiment of FIG. 3 illustrates a first retainer piece 100 which has a generally Z-shape or step shape in cross section. Although this is the preferred embodiment, it is also possible to form the first retainer piece so as to have an "H" or, alternatively, a "U" or "C" cross-sectional shape, as shown in FIGS. 5 and 6, respectively, when viewed along the line 4—4 of FIG. 3. In FIGS. 5 and 6, reference numerals 106', 104', 108' and 106", 104" and 108" are used to denote the top and bottom rings and the bars, respectively. The embodiments of FIGS. 5 and 6 can easily be formed using a mold, but they cannot be easily formed using a die, as is the case of the embodiment of FIG. 4.

As is readily evident, the retainer of FIG. 3 can be formed using conventional milling or molding procedures, and all the disclosed retainer embodiments can be economically manufactured and assembled in an epicyclic transmission since only two retainer pieces need to be formed. In addition, since each of the bars 108 has side surfaces 112 which taper away from the first and second surface regions 72, 53, respectively, of the set of conjugate races, the bars 108 and, hence, the retainer 96 never come in substantial contact with either of the first and second confronting surface regions, as shown in FIG. 2. Accordingly, the retainer of the present invention does not limit the lobe design of the first and second confronting surface regions 72, 53, which allows lobe designs which result in the lobes of the confronting surface regions almost touching at the point of nearest approach 134 located near the top dead center radial position of the cams 30. Such a close lobe design achieves maximum possible torque transfer between the first and second confronting surface regions which improves the performance of the epicyclic speed reducing transmission.

In addition, the retainer achieves accurate control of the rollers so that the rollers are maintained appropriately spaced apart. Also, since the side surfaces of the rollers each confront and contact the lobes 124 on the bottom ring 104 and the second retainer piece 102, axial movement of the rollers is prevented or kept to a bare minimum. Since the rollers are rotationally contained within the plurality of spaces 116, conventional, solid rollers can be utilized in the epicyclic speed reducing transmission which eliminates the need for numerous retaining pins and longitudinal bores in the rollers to accommodate the pins.

Finally, the retainer of the present invention maintains the rollers 80 in position with a minimum amount of energy loss caused by friction since the retainer 96 carries a relatively small load.

We claim:

1. An epicyclic speed reducing transmission, comprising:
   first gear means (70) having a first surface region (72);
   second gear means (50) having a second surface region (53) which confronts said first surface region;
   cam means (10, 30) for orbitably driving one of said gear means and said corresponding confronting surface regions;
   a set of cylindrical rollers (80) disposed between said first and second confronting surface regions for transmitting torque therebetween;
   said first and second confronting surface regions each comprising a series of lobes (126) and recesses (128) shaped and arranged such that a first recess (128') on said first confronting surface region confronts a second recess (128") on said second confronting surface region and also such that a first lobe (126') on said first confronting surface region confronts a second lobe (126") on said second confronting surface region;
   said first and second confronting recesses being on a substantially diametrically opposite side (130, 132) of said first and second confronting surface regions, respectively, than said first and second confronting lobes;
   said first and second confronting surface regions being further shaped and arranged such that only one of said cylindrical rollers can be contained between said confronting recesses and only one of said cylindrical rollers can be contained between said confronting lobes;
   a retainer (96) for retaining said plurality of cylindrical rollers in spaced relationship between said first and second confronting surface regions, said retainer comprising:
   a first retainer piece (100) including a top (106) and a bottom (104) surface interconnected by a plurality of bars (108), said bars being shaped and arranged into a pluarlity of pairs (114) each of which includes first and second bars having confronting first curved surfaces between which one of said cylindrical rollers can be rotatably retained;
   said first and second bars of each of said pairs each having further second and third surfaces (112) extending from opposite ends of said respective curved surface thereon and which continuously taper inwardly towards one another and meet at an apex (136) so that each bar has a wedge-like shape, respective apexes of said first and second bars of each of said pairs of bars facing and being separated from respective apexes of bars of adjacent pairs of bars so that adjacent pairs of bars are separated by empty space.

2. The transmission as claimed in claim 1, wherein said second and third surfaces of each of said bars taper inwardly towards one another so that neither of said second and third surfaces on bars located within an angle of 20° from or located at an angle greater than 70° from a top dead center position of said cam means touch either of said first and second confronting surface regions.

3. The transmission as claimed in claim 2, wherein at least one of said second and third surfaces of at least one of said bars located between 20° and 70° of said top dead center position of said cam means contacts either of said first and second confronting surface regions.

4. The transmission as claimed in claim 2, wherein said second and third surfaces of each of said bars taper inwardly such that neither of said second and third surfaces of any of said bars contacts either of said first and second confronting surface regions.

5. The transmission as claimed in claim 2, wherein said bottom surface of said first retainer piece confronts a first end surface of each of said cylindrical rollers, said retainer further comprising:
a second retainer piece (102); and
means for securing said second retainer piece to said top surface of said first retainer piece so that said second retainer piece confronts an opposite second end surface of each of said cylindrical rollers.

6. The transmission as claimed in claim 5, wherein said bars have a length which is sufficiently long so that said top and bottom surfaces of said first retainer piece confront and are in close contact with side surfaces of either of said first and second confronting surface regions.

7. The transmission as claimed in claim 6, wherein said bars are substantially perpendicular to said top and bottom surfaces of said first retainer piece.

8. The transmission as claimed in claim 5, wherein said bottom surface of said first retainer piece has a plurality of small first protrusions (124) extending therefrom towards said first end surface of said cylindrical rollers, one of said first protrusions being positioned between respective first and second bars of each of said pair of bars at a position which lies substantially on an axis of said respective cylindrical roller rotatably supported between said respective first and second bars; said second retainer piece having a plurality of small second protrusions extending therefrom toward said second end surface of said cylindrical rollers, one of said second protrusions being positioned opposite each of said first protrusions and substantially on said axis of each of said respective cylindrical rollers.

9. The transmission as claimed in claim 2, wherein said first curved surface of each of said bars in arc-shaped such that an outer cylindrical surface portion of said respective cylindrical roller being retained by said curved surface extends radially outward from said opposite ends thereof with respect to an axis of said respective cylindrical roller.

10. The transmission as claimed in claim 2, wherein said first retainer piece is formed out of a single piece of material by carving away appropriate portions of said material to form a ring-shaped material, by further carving away appropriate portions of said ring-shaped material from opposite sides thereof to form said top and bottom surfaces, and by drilling a plurality of holes into said top surface so that said holes do not pass through said bottom surface to form said plurality of bars so that said first retainer piece constitutes an integral single element.

11. The transmission as claimed in claim 5, wherein said second retainer piece is ring-shaped.

12. The transmission as claimed in claim 2, wherein said first retainer piece is formed in a mold.

13. The transmission as claimed in claim 10, wherein said first retainer piece has a Z-shaped cross-section.

14. The transmission as claimed in claim 1, wherein said first retainer piece has a C-shaped cross-section.

15. The transmission as claimed in claim 1, wherein said first retainer piece has an H-shaped cross section.

16. The transmission as claimed in claim 3, wherein said retainer is made of a plastic material.

* * * * *